United States Patent
Hunka

(10) Patent No.: US 10,001,789 B2
(45) Date of Patent: Jun. 19, 2018

(54) MULTIFUNCIONAL ENVIRONMENTAL CONTROL UNIT

(71) Applicant: Robert Hunka, Oakland, CA (US)

(72) Inventor: Robert Hunka, Oakland, CA (US)

( * ) Notice: Subject to any disclaimer, the term of this patent is extended or adjusted under 35 U.S.C. 154(b) by 622 days.

(21) Appl. No.: 13/694,773

(22) Filed: Jan. 3, 2013

(65) Prior Publication Data

US 2014/0188286 A1    Jul. 3, 2014

(51) Int. Cl.
G05D 25/00   (2006.01)
G05D 23/19   (2006.01)
F24F 11/00   (2018.01)

(52) U.S. Cl.
CPC .......... *G05D 23/19* (2013.01); *F24F 11/0001* (2013.01); *F24F 11/0012* (2013.01); *F24F 11/0034* (2013.01); *F24F 2011/0056* (2013.01)

(58) Field of Classification Search
CPC ..... G04F 1/32; G04F 1/3203; G05D 23/1927; G05D 23/1928; G05D 23/193; G05D 23/1931; G05D 23/1932
USPC ........ 700/276, 277, 278, 299, 300; 165/253, 165/254; 236/1 B, 1 C, 37; 454/239, 454/256; 234/44 C, 91 R, 91 D, 910; 340/229
See application file for complete search history.

(56) References Cited

U.S. PATENT DOCUMENTS

| | | | |
|---|---|---|---|
| 4,802,100 A * | 1/1989 | Aasen et al. | 700/288 |
| 6,840,053 B2 * | 1/2005 | Lindner et al. | 62/140 |
| 7,957,839 B2 * | 6/2011 | Takach et al. | 700/276 |
| 8,630,742 B1 * | 1/2014 | Stefanski et al. | 700/278 |
| 8,645,495 B2 * | 2/2014 | Johnson et al. | 709/218 |
| 8,826,678 B2 * | 9/2014 | Nakagawa et al. | 62/177 |
| 2006/0234621 A1 * | 10/2006 | Desrochers et al. | 454/239 |
| 2012/0022702 A1 * | 1/2012 | Jang | F24F 11/006 700/277 |
| 2012/0095605 A1 * | 4/2012 | Tran | B05D 5/00 700/285 |
| 2012/0310417 A1 * | 12/2012 | Enohara et al. | 700/276 |

* cited by examiner

*Primary Examiner* — William V Gilbert

(57) ABSTRACT

A novel multifunctional electromechanical device to monitor and control environmental conditions within an occupied space. This device can be configured as a standard VAV Diffuser, an intelligently controlled window, or an intelligently controlled shutter. Functions include thermal control, and air quality control. The device would be built and located to optimize functionality and satisfy the aesthetic needs of occupants, designers, and architects. Energy harvesting combined with ultra-low power operation would reduce the long term operational costs. Mechanical and electronic modularity would facilitate the incorporation of new functions and to upgrade existing functions to improve performance and reduce cost. Additionally, a gas flow damper device that would sense pressure differential integrally or remotely and intelligently control pressure differential. A self powered, energy harvesting damper could be used to balance pressures to various ones in an office space providing just enough air flow to satisfy each zone. Wireless node network would allow communication between multiple balancing dampers to create a highly collaborative network.

5 Claims, 15 Drawing Sheets

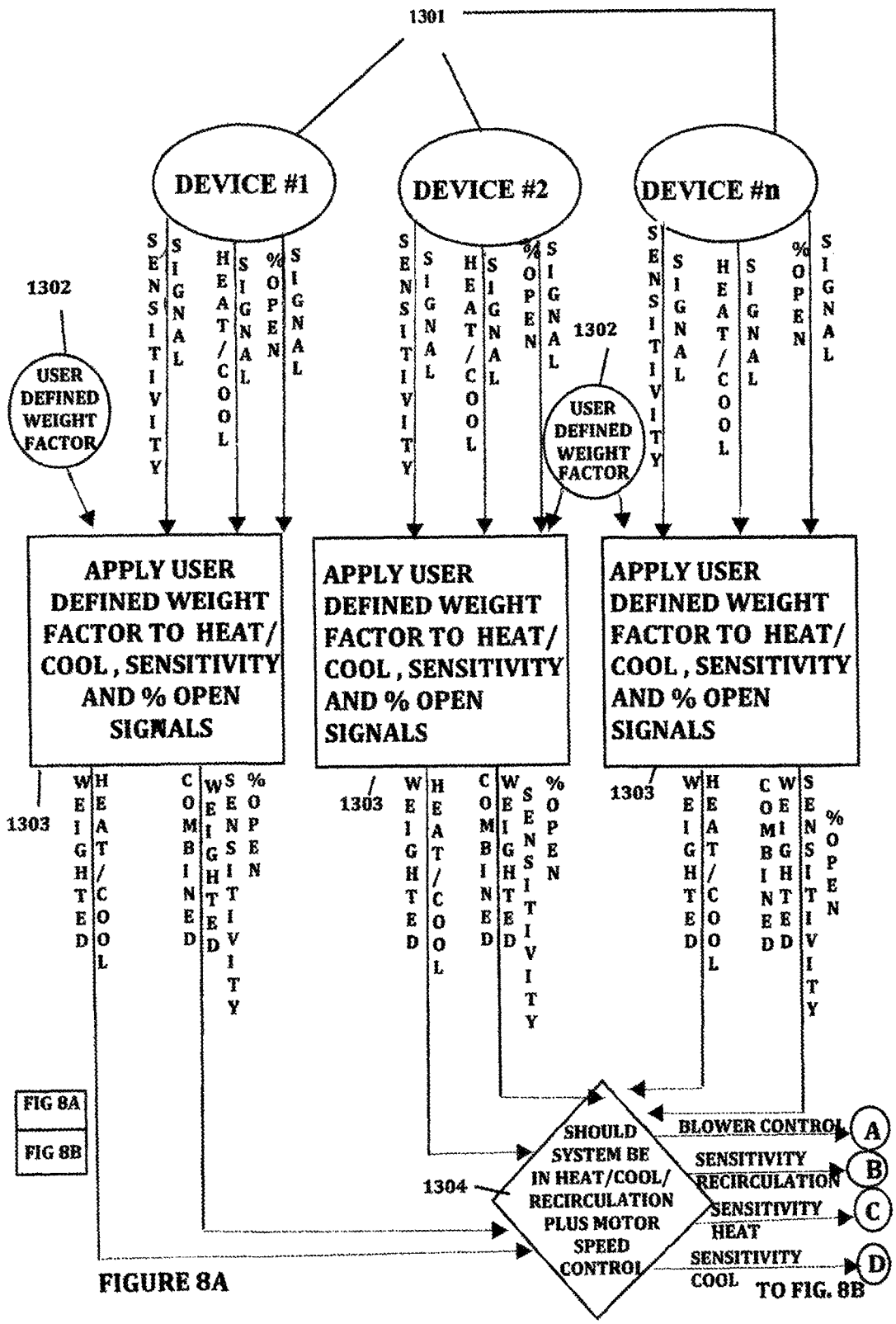

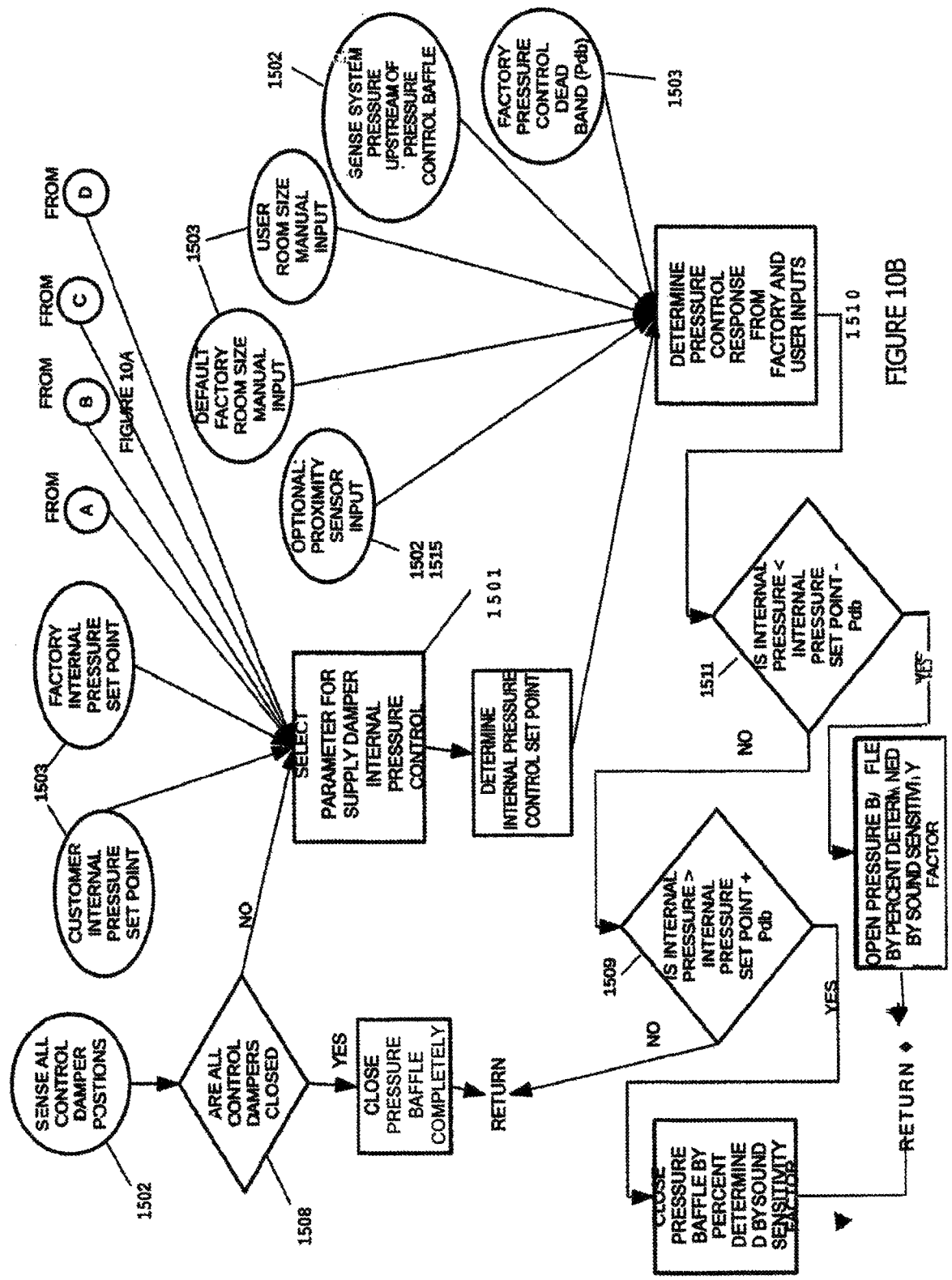

MULTIFUNCIONAL ENVIRONMENTAL CONTROL UNIT

This utility patent application claims the priority of provisional application of U.S. 61/631,388 filed on Jan. 3, 2012.

BACKGROUND OF THE INVENTION

Field of Invention

I. The invention relates to environment control and regulation with multifunctional capability, specifically, but not limited to, an improved intelligent variable air volume device. Additionally, this invention relates to controlling the opening/closing of windows or dampers allowing introduction of clean air from another location (i.e. ambient outside air) to maintain acceptable indoor air quality (Indoor Air Quality Control Device) and/or the introduction of air at a different temperature for thermal control (Temperature Control Device). The pressure differential producing the air flow can be driven by wind, a fan blowing into the space, or a fan blowing outward creating a negative pressure, or the buoyancy forces create by temperature difference. When the temperature of an enclosed space with a tower, venting to ambient atmospheric conditions, rises due to heat generated by occupancy, computers, other equipment, buoyancy forces create a negative pressure in the space. That negative pressure creates a pressure differential across windows or diffusers being fed by ambient atmospheric conditions or diffusers being fed by pressurized conditioned air.

II. The environmental control can also be implemented without the movement of air by opening/closing a Thermal Radiation Blocking Device (i.e. shades) that block or allow thermal radiation from a higher or lower temperature mass (i.e. the sun).

III. Additionally, the Pressure Control Assembly can be implemented as a standalone unit for installation in the system duct work to allow a balanced control of conditioned air to the individual terminal diffusers or registers supplying each zone of interest. A wireless network of communication between intelligent pressure control units and the system fan/blower would control a flow reduction or increase capability of each balancing damper optimizing energy conservation.

IV. Energy harvesting combined with ultra-low power sensing, communication, actuation, and a control algorithm would allow wireless operation requiring only a backup battery or super capacitor when harvested energy is low or a power surge is required.

Related Art

There are many modes and methods of controlling conditioned air flow within the environment of dwellings, commercial spaces and industrial spaces. Typically an HVAC system requires a blower and heating/air conditioning control units to feed the fixed terminal registers and diffusers with sufficient thermal capacity and pressure differential to regulate temperature and air movement. Uniformity of acceptable temperature distribution within an occupied space is a function of air in the optimum temperature range moving in the optimum direction with sufficient velocity. There are many methods of controlling air exiting the diffuser, from simple manually operated valves or switches to actuator/damper assemblies controlled by electronics incorporating complex control algorithms. Within an occupied space and within a location with multiple occupied spaces, there is a greatly expanding requirement for individuals to communicate with and control their environment. The accuracy and efficiency of that effort improves quality of life. Technological advances and expansion incorporate devices that require a central hub where these capabilities can be coordinated and optimized.

Advantages in Thermal Control Over Prior State of the Art

Disadvantages of Prior Self-Powered Diffuser State of the Art

I. Performance Affected by System Pressure
A. Excessive aerodynamic sound limits supply pressure at diffuser to 0.3 in-H2O
B. Blades "blow open" uncontrollably at supply pressure exceeding 0.5 in-H2O
C. Pressure related forces on the actuators create offsets in temperature control setting require adding a pressure control box or modification to standard VAV box (modified for pressure control) upstream II. Performance Affected by System Supply Air Temperature
A. Thermal element "wax" range needs compensation for effects of system temperature to accurately control the room temperature. Set point changes result from the influence of significant changes in supply temperature during either the heating or cooling mode
B. Changeover wax actuator located near the connection to the supply duct can be driven to non functionality by very high supply temperature
C. Room wax actuators can be driven to non functionality by high supply temperature.
D. Room temperature range is limited to 70 to 78 deg F. operating point
E. Room temperature is sensed by room air circulating at diffuser height. Sometime delay is involved between temperature to be controlled at desk level and temperature sensed by controlling diffuser in the ceiling on system startup or after closing tightly due to load being satisfied or reduced' under low load conditions. If the room air circulating at the ceiling to operate the controlling actuator when the primary supply air flow is low, accurate measurement of room temperature and proper control is inhibited
F. A similar delay in response occurs due to poor air induction movement at diffuser room element under low supply pressure conditions
G. After changeover between heating and cooling modes, some thermal "stabilization" time is require for standard operation III. Performance Affected by Other Mechanical Interaction
A. As a result of mechanical friction or wax chemistry induced hysteresis, detrimental control dead band, as well as, time delays are created. The number of parts with their related tolerances combined with "play" in the linkage for movement further amplify the dead band
B. Because of the use of lever arms in the assembly, high external force can act on the wax actuators and cause operational changes over time and life expectancy deterioration. Wax actuators have internal hysteresis and must overcome the frictional and tolerance variables to achieve proper positioning. There is no position feedback to compensate for these effects.

C. The operation of the multiple-part linkage. hinged blades for controlling air flow are sensitive to pressure drop and aerodynamic forces created by air flow IV. Performance Affected by Limited Directional Control for Air Flow A. Ceiling diffusers typically direct air flow horizontally along the ceiling and then downward upon hitting a wall or partition. The best Air Diffusion Performance Index (ADPI—namely, proper balance between air temperature and air velocity at numerous points in the occupied space) is achieved when a specific range of air velocity is maintained at the nearest wall. Velocity that is too low will result to temperature stratification. Velocity that is high can result in drafty conditions in the cooling mode. While cooling from the ceiling with a horizontal throw pattern is good, driving heated air along the ceiling and down a wall (particularly down a cold window) may be difficult.

B. Partitioning individual spaces within an open office with cubicles can be difficult when adjacent ceiling diffusers compete and can over-ride each others thermal control operations V. Performance Affected by High Aerodynamic Sound and Noise A. As a result of the ceiling diffuser being the modulating controller (high pressure drop at the visibly exposed blade tips), a high velocity occurs at the air discharge area of the diffuser. The acceptable sound level is subjective determination depending on other local conditions but must be controlled at an acceptable level. This requires upstream dynamic pressure control with a separate box or a modification to a standard VAV box. The sheet metal construction for the typical throttling surfaces are not perfectly straight or in good alignment and can create high pitch audible whistling at nearly closed conditions VI. Acceptance Affected by Appearance and Aesthetics A. Flatness in the outside perimeter of the diffuser is important to providing a visually continuous ceiling look. If the appearance panel, blocking the internal mechanism, is noticeably below the plane of the ceiling, the continuous look is also disrupted.

B. Painted sheet metal, if not properly handling can be scratched requiring touch up or replacement. Colors and textures are limited for painting VII. Limitations of Current Externally Powered Electronic Diffusers A. Limitations of current externally powered electronic diffusers having the above thermal actuators, sensing capabilities, and mechanical linkages can be controlled electronically with microcontrollers using control algorithms with a larger number of program steps. Fine tuning, through years of empirical testing, are required to provide the proper accuracy and dynamics for full room thermal control. Unusual load changes (i.e. conference room, or intermittently occupied spaces) can produce borderline acceptable performance. Power levels required for electrically operating wax actuators virtually negate standalone (without wires) operation using energy harvesting (even with battery backup). Electronic units typically measure the temperature to be controlled with sensors located on a wall or near a desk. these measurements are affected by transient conditions of room air circulation patterns. when mounted on the wall they are not a accurate representation of temperature at desk level away from the wall.

Proposed Electronic VAV Diffuser to Overcome Prior Art Limitations

I. Energy Harvesting Operation

A. Ultra low power electronic circuitry is capable of working from energy harvesting power sources (with battery backup).

B. Low power actuators are used for room temperature control and supply pressure control C. A damper design where the assembly is relatively flat and damper movement is perpendicular to the movement of air the device minimizes the operating forces. the iris type damper, rotating cylinder type damper, and the rolling cylinder type damper enables highly sensitive proportional control for long term operation can then be provided by an inexpensive, low power actuator.

D. An expert control algorithm implements the understanding that controlling temperature in an open space with thermal mass and typically small hourly load changes is best controlled by small air flow adjustments combined with intelligently programmed delays. Averaged energy usage over time is greatly reduced E. Ultra-low power sensing devices is incorporated for remote room temperature, supply air temperature, baffle position, system supply pressure. diffuser discharge pressure, occupancy detection for control and security, and safety functions of fire and smoke detection F. Ultra-low power communicates with room components and main conditioned air system components G. Energy harvesting techniques utilizes piezoelectrics, thermoelectrics, radio frequency (rf) energy, electromagnetic, and air flow fan generators H. Energy harvesting power options may be further enhanced by combining real time energy harvesting with energy storage utilizing super capacitors, batteries, or hybrid capacitor/battery combination II. Intelligent Air Distribution Characteristics for Heating/Cooling in an Individual and in Open Offices A. Internal throttling dampers allows a combination of horizontal and vertical air flow patterns to intelligently handle office geometries (individual or an open office) under variable load conditions III. Mechanism Designed to Minimizes Detrimental Mechanical Effects A. Options discharge air damper movement minimizes the effects of pressure drop on opening and closing 1. Sliding motion—for both heating and cooling, dampers move essentially perpendicular to the pressure drop creating the air flow to minimize or eliminate any offset or blow open effects 2. Rotating motion—individual dampers (possibly cylinders) rotate on a centrally located axis exposing open areas for air flow 3. Rolling motion—dampers (possibly cylinders) roll translationally out of a sealing area to expose open area for air flow B. In the case of the opening/closing of a smart window where weight and alignment are more significant than the effects of pressure drop, the intelligent drive mechanism would be attached to an opening window (I.e. Awning, casement) from another manufacturer modified to accept the proposed mechanism C. Internal supply pressure baffles for diffuser discharge pressure control reduce the pressure drop across the thermal control baffles minimizing frictional effects producing hysteresis and reducing noise
D. A diffuser supplying air to a space with very low load requirements needs to shut off tightly to maintain temperature set point and minimize unnecessary system energy usage. The proposed supply pressure control mechanism is positioned in a smaller, non-visible area of the diffuser where a tight shut off is more easily achieved. The control algorithm is written so that when the temperature in the space is satisfied and temperature control damper is at its closed position, the supply pressure control function would be overridden and the supply damper will close more tightly.
E. Actuators for room air control and diffuser discharge pressure control operate with negligible hysteresis and nearly instant response. Possible technologies for actuation include piezoelectric, small efficient motors, enhanced bi-metal, enhanced memory metal, linear transducers
F. A much more efficient and streamlined universal intelligent control algorithm enabled by state of the art sensing modules and low hysteresis, precision actuators with position feedback IV. Multiple Diffuser Communicating for Integrated System Control
A. Complete system balancing—all diffusers communicate with each other allowing the control logic in each diffuser to adjust individual internal system baffles to properly distribute conditioned air to the diffusers responsible for each occupied space as a function of their individual load requirements.
B. Additional control logic in each diffuser provides fail safe damper closure—on smoke detection, fire detection, or loss of power
C. Control logic incorporates state of the art mechanical system components with advanced energy conservation principles.
D. Reprogramming for design improvements would be enabled by easily mastered human interface commands.
E. An integrated universal. intelligent control algorithm makes decisions based on weighting factors 1) for controlling the ADPI (air diffusion performance index—the relationship between air temperature and air velocity for comfort in the occupied space), whether an open office, conference room, interior office or outer perimeter office under heating or cooling conditions. 2) over-rides for security, safety and 3) employing energy conservation factors based on optimum time response intervals. 4) System balancing to compensate for duct configurations and 5) system blower control for energy, durability, and maintenance V. Improved Aesthetics for Architects and Occupants
A. Housing and internal parts uses smoke and fire rated plastic. Production process is selected for producing rigid, flat, durable, color-thru (paintable) parts to minimize weights and maximize customization for architectural preferences
B. Exposed face of the controlling diffuser is positioned visibly flush with surrounding ceiling features. Openings for required air flow are minimized to provide only sufficient area for load requirements. Appearance is virtually flat when closed during low or no load requirements
C. Sound absorption techniques reduce aerodynamic noise allowing operation at higher pressure levels (which maintain proper air circulation in larger rooms or under low load conditions primary air volume is reduced but high air velocity is required for good air circulation)

VI. Advantages of Integral Infrared Temperature Sensing
A. Mounting an infrared temperature sensor in the diffuser allows an unobstructed direct view of the thermal properties of all objects in its built in angle of detection. The angle of detection can be factory fixed or constructed for field adjustment. The field adjustment can be achieved by manually swiveling the sensor to direct toward a particular area or, in the case of a multi-pixel sensor, selecting the pixels for action that represents the areas of interest. (Relatively inexpensive uncooled infrared sensor displays have been developed, I.e. Calsensor scd-15 and Panasonic Grid-Eye). Infrared temperature sensing of an area of interest allows a more stable determination of the thermal conditions within that area and is not effected by transient air movement in the area of interest. Effectively, the infrared sensor is averaging the ambient temperature over time and over the area of interest. From an energy conservation and energy harvesting standpoint, the controls are less subject to cycling on and off. Conditioned air is provided to meet the true stabilized needs of the space. The actuator does not need to make adjustments as often and as large so the energy used over time for dampering is minimized allowing energy harvesting to more fully satisfy those requirements. The output of a multi-pixel array broadcast wirelessly to a display or computer would allow the occupant to select the pixels of interest for the control algorithm. Infrared sensing in addition to object surface temperature measurement will also be responding to thermal mass loads. The greater the heat capacity of a hot or cold object, the slower its response is to diffused conditioned air. The sensor will respond to the environment similar to the way people will feel heat when standing near a hot or cold object.
B. Another advantage of the infrared temperature sensor and any of a number of other analog output sensors (including the proposed pressure differential sensor) is to utilize a pulse width modulated output where the output is proportional to the sensed temperature. with RC type electronic filtering, a wave type analog signal is produced. the amplitude and period of the signal can be fine tuned to create a "soft" opening/closing of the device when integrated with an intelligent control algorithm. Modern control algorithms are based on complex variables, i.e. PID control, which are not efficient or necessarily appropriate for room temperature control in a HVAC system. Movement of conditioned air where circulation patterns are time dependent and where temperature changes are moderated due to the thermal mass and other heat sources and heat sinks in the area of interest. Our simple approach minimizes computational time and energy increasing the ability to function with energy harvesting power source. temperature changes are moderated due to the thermal mass and other heat sources and heat sinks in the area of interest. our simple approach minimizes computational time and energy increasing the ability to function with energy harvesting power sources V. Advantages in Stand Alone System Pressure Balancing Unit Over Prior State of the Art
A. After hvac installation in new construction or a significant modification to an existing design, a considerable amount of time and money is spent in manually adjusting the numerous balancing dampers to allow sufficient air flow to each conditioned one. This money is spent in manually adjusting the numerous balancing dampers to allow sufficient air flow to each conditioned one. This activity is guided by a design parameters calculated by engineering based so estimated space usage. If this initial estimate is incorrect, overly conservative or optimistic, for if the intended usage changes, then the costly process of manual balancing must be performed again. If additional spaces are added or activated, manual balancing must be redone. In any case, the settings are static between adjustments and are successful only as an average over time and cannot automatically change with the intermediate cycles that occur on a daily basis.

Proposed Intelligent Balancing Damper to Overcome Prior Art Limitations

The intelligent balancing damper would incorporate a pressure/differential pressure sensing element, a low power actuator, a throttling mechanism to restrict air flow, an intelligent control algorithm to implement pressure balancing to satisfy area requirements with energy conservation considerations given a high priority. Communication between pressure balancing units and with the central fan/blower would allow dynamic adjustments nearly instantaneously. Outcome would enable optimum dynamic control while minimizing energy usage VII Intelligent Window/Shutter-Anew Device for Thermal Comfort or Pressure Differential Control A. Even though an operable window or shutter is not normally considered as a diffuser for thermal comfort control, in a broad sense, it is covered under this application. A "diffuser" is a device that directs air into a space. this application covers intelligently controlled "diffusers" that delivered thermally conditioned air driven by a pressure differential produce by external sources. in the case of an operable window or shutter as an intelligent "diffuser" the pressure differential between external ambient conditions and internal conditions can be produced by ambient wind. creating a positive pressure with respect to internal conditions, or a fan at this window or shutter in another external location blowing out to create a negative pressure in the internal space. The temperature difference is developed by the external temperature (for example, early morning cooler temperatures) available to cool an internal space heated by combination of occupancy, lighting, electronics, and solar thermal radiation transmitted through a glass area. A temperature sensor, particularly, an infrared temperature sensor, directed toward objects near the window or shutter, would remotely measure the average temperature of the objects in its field of view, and through the intelligence built in the control algorithm supplemented by "set point" input by occupants of interest, open or close the window or shutter in an optimally controlled actuation. Currently, high cost are incurred on startup of a newly installed HVAC system as a result on the cost of labor of manually adjusting each balancing damper in an iterative manner. subsequently, future manual readjustments are required upon expansion, contraction, or realignment of the occupied zones.

VIII. The Intelligent Window/Shutter/Diffuser Approach is not Limited to HVAC System, or Outside (Ambient) to Inside (Occupied) Applications A. Any two adjacent enclosed area in immediate contact or connected by channels or ductwork can be balanced thermally or by pressure differential by sensing the temperature in the different enclosed areas and opening and closing the window/shutter/diffuser based on the intelligent control algorithm supplemented by the a "set point" input by occupants of interest. The simplicity, cost effectiveness, and accuracy of the sensor combined with a simple but responsive control algorithm would accomplish our goal of high value for numerous applications. for example, This approach could be used for cooling large scale electronic storage "farms" where the pressure difference for "cooling" air flow is driven by air. heated by the sun in a solar structure. rises by buoyancy through a single or multiplicity of vertical tubes exhausting to ambient conditions.

BRIEF SUMMARY

A. The invention provides for, according to one general embodiment, a novel cost effective smart or intelligent HVAC diffuser. It is general realized that individual diffuser control is better than VAV boxes. We propose an electronically controlled diffuser incorporating computer technology and algorithms overcoming the limitations of wax encapsulated thermal actuators Stand-alone (not requiring a wired power source) capability operates from energy provided by energy harvesting components and backed up with energy storage components (battery, super capacitor other).

B. The invention provides for, according to another embodiment, a novel cost effective smart or intelligent window/shutters/damper. The device incorporates an integral sensor that measures temperature in a remote location and opens or closes the window/shutter/damper to satisfy the goals of the embedded control algorithm. Stand-alone (not requiring a wired power source) capability operates from energy provided by energy harvesting components and backed up with energy storage components (battery, super capacitor other).

C. The invention provides for, according to another embodiment, a novel cost effective pressure or differential pressure damper. The assembly minimizes the detrimental effects of high pressure drop and aerodynamic forces. The device incorporates a low cost sensor which measures differential pressure and opens or closes a damper to satisfy the goals of an imbedded control algorithm. The device would work as a stand-alone unit or wirelessly communicate with other similar devices to create a highly integrated, energy efficient ducted system. Power to operate all functions is provided by energy harvesting components and backed up with energy storage components (battery, super capacitor other).

D. Other aspects and advantages of the present invention will become apparent from the following detailed description which when taken in conjunction with the drawings, illustrates by way of example the principles and structure of the invention.

BRIEF DESCRIPTION OF THE DRAWINGS

Taking the following specifications in conjunction with the accompanying drawings will cause the invention to be better understood regarding these and other features and advantages. The specifications reference the annexed drawings: wherein.

DETAILED DESCRIPTION OF THE PREFERRED EMBODIMENTS

While describing the invention and its embodiments, various terms will be used for the sake of clarity. These terms are intended to not only include the recited embodiments, but also all equivalents that perform substantially the same function, in substantially the same manner to achieve the same result.

Figure 1:
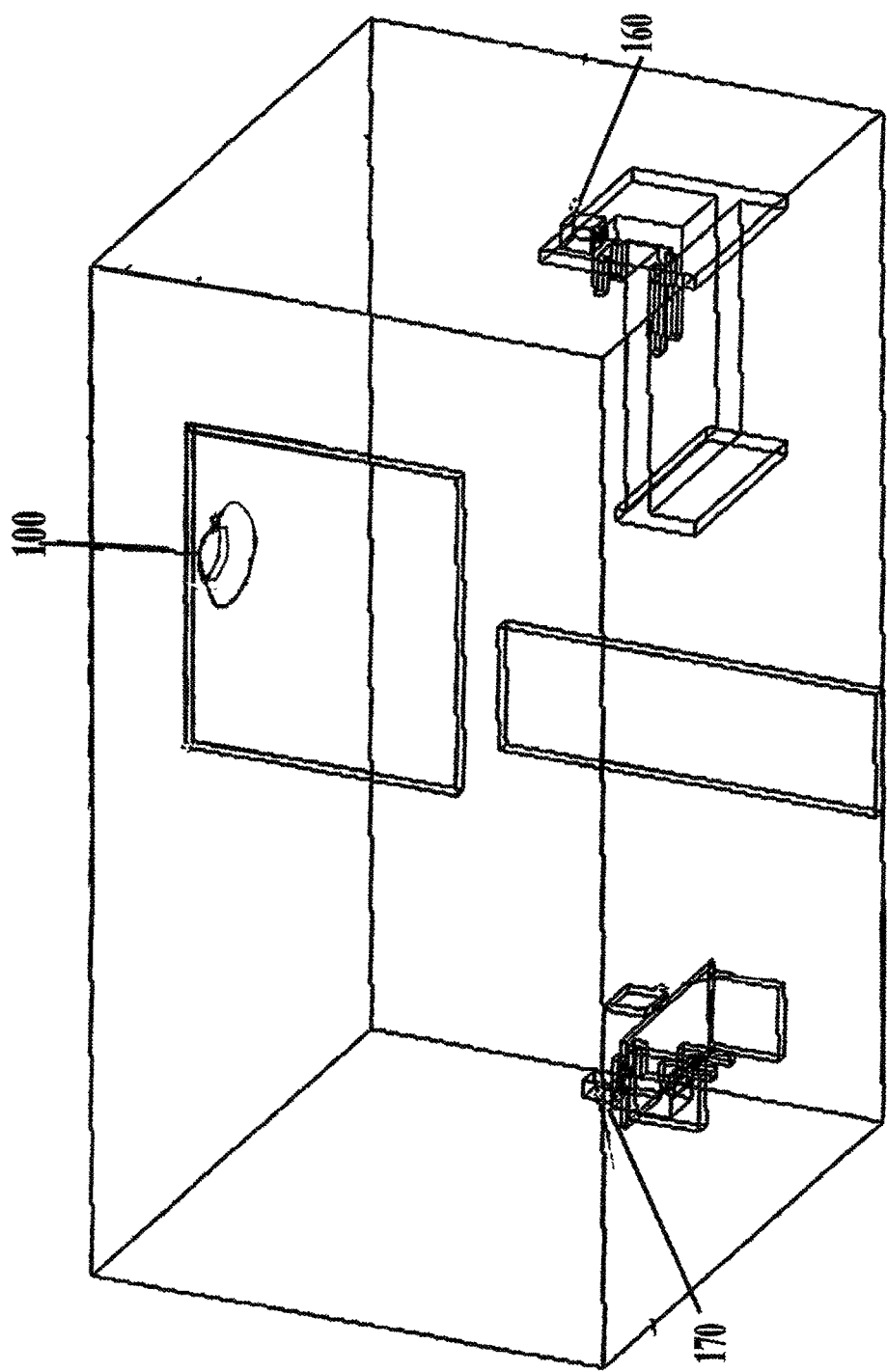
FIG. 1 is a perspective view of air diffuser housing assembly

A. Now referring to FIG. 1 which discloses a preferred embodiment of the present invention, an air diffuser housing assembly generally referenced by numeral 100 which is depicted in a closed environment, such as a room or office wherein the unit 100 has the functionality of the following, it can sense external and internal properties, such as temperature, pressure, and position, and control the movement of conditioned air for thermal control Occupants, referenced by numerals 170 and 160, will benefit from the multi-functional capabilities of the an air diffuser housing assembly.

Figure 2:
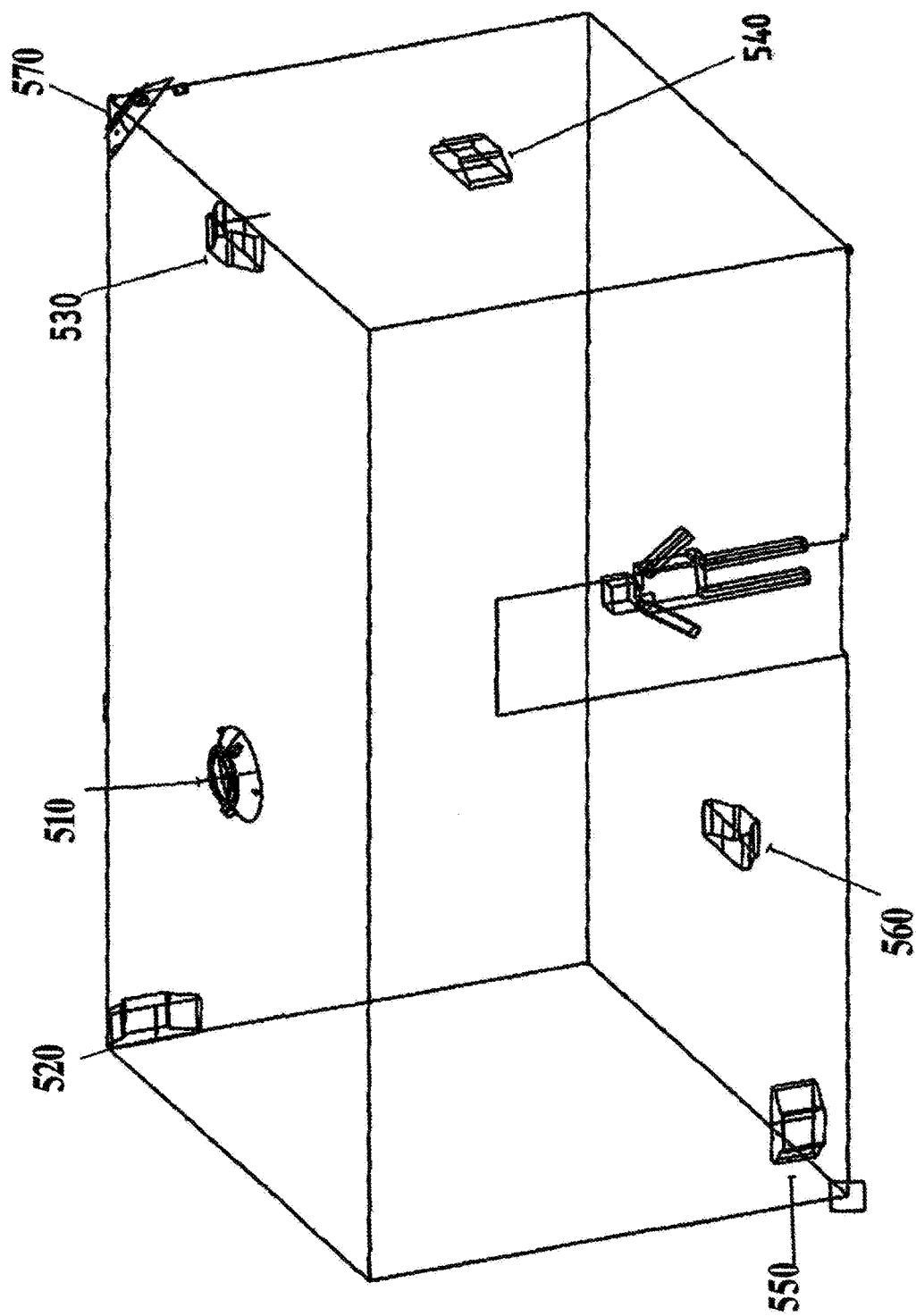
FIG. 2 is a perspective view of other occupied space locations for the air diffuser housing assembly enabling the multifunctional capabilities utilizing "iris" type damper assemblies.

B. Now referring to FIG. 2 which discloses optional locations for the controlling unit. Optional locations for controlling unit include centrally located in the ceiling referenced by numeral 510, at the ceiling/wall corner along a long wall in a rectangular room referenced by numeral 520, at the wall referenced by numeral 540, at a wall referenced by numeral 550, at a ceiling/wall corner along a short wall referenced by numeral 530, and at a under floor location referenced by numeral 560

C. Now referring to FIG. 3 which discloses the one possible internal construction of the controlling unit which embodies the improvement capabilities described above. Internal components include an internal sensing element for occupied space detection and communication referenced by numeral 140, and an infrared sensor for measurement of external environmental thermal conditions referenced by numeral 610, and system supply communication 180, a movable horizontal air flow baffle assembly referenced by numeral 630, an actuator for positioning the movable horizontal air flow baffle assembly 630 referenced by numeral 640, a movable vertical air flow baffle assembly referenced by numeral 660, an actuator for positioning the movable vertical air flow baffle assembly 660 referenced by numeral 670, a moveable supply pressure baffle assembly referenced by 690, a supply pressure actuator to position the moveable supply pressure baffle assembly 690 referenced by 695, an internal supply air temperature sensor referenced by numeral 696, an internal pressure sensor referenced by numeral 697 with a tube referenced by numeral 617 to communicate internal pressure to the pressure sensor 697, a position sensor for the movable horizontal air flow baffle assembly 630 referenced by numeral 631, a position sensor for the movable air flow baffle assembly 660 referenced by numeral 661, a position sensor for the moveable supply pressure baffle assembly 690 referenced by numeral 691, a housing for the electronic control unit referenced by numeral 600, and a lower face plate for the controlling unit referenced by numeral 607, an arm referenced by numeral 611 attached to actuator 670 to drive a post referenced by numeral 612 and the housing for the complete air diffuser housing assembly referenced by numeral 601.

D. Now referring to FIG. 4, which further discloses a more detailed exploded view of the control unit depicted in FIG. 3. Components are referenced by numerals 140, 180, 600, 601, 607, 610, 611, 612, 617, 630, 631, 640, 660, 661, 670, 690, 691, 695, 696, 697. Additional components include bearings referenced by numeral 604 under each movable wings of the moveable horizontal air flow baffle assembly 630, posts referenced by numeral 603 guiding the horizontal air flow baffle assembly 630 and bearings 604, a rotating plate referenced by numeral 606 with attached pins referenced by numeral 605 whereby the pins engage slots in the moveable horizontal baffle wings 630 to rotate them thereby exposing a flow gap between the housing 601, an actuator mounting plate referenced by numeral 608 to support actuators 640 and 670, a cam like drive mechanism referenced by numeral 609 attached to actuator 640 to rotate the rotating plate 606, an arm referenced by numeral 611 attached to actuator 670 to drive a pin referenced by numeral 612 attached to vertical moving baffle 660 thereby exposing a flow gap between the fixed plate 607 and moveable vertical air flow baffle assembly 660, posts referenced by numeral 612 mounting the complete moveable horizontal and moveable vertical air flow baffle assembly to the housing 601, a gas impermeable flexible fabric referenced by numeral 613 to block the internal supply air upon actuation of the internal supply pressure baffle assembly 690, a fixed support plate referenced by numeral 614 with attached pins referenced by numeral 615 to guide the bearings referenced by numeral 616 and the individual arms of internal supply pressure baffle assembly 690, an internal pressure sensing tube referenced by numeral 617 to communicate internal static pressure to internal pressure sensor 697.

Figure 5:
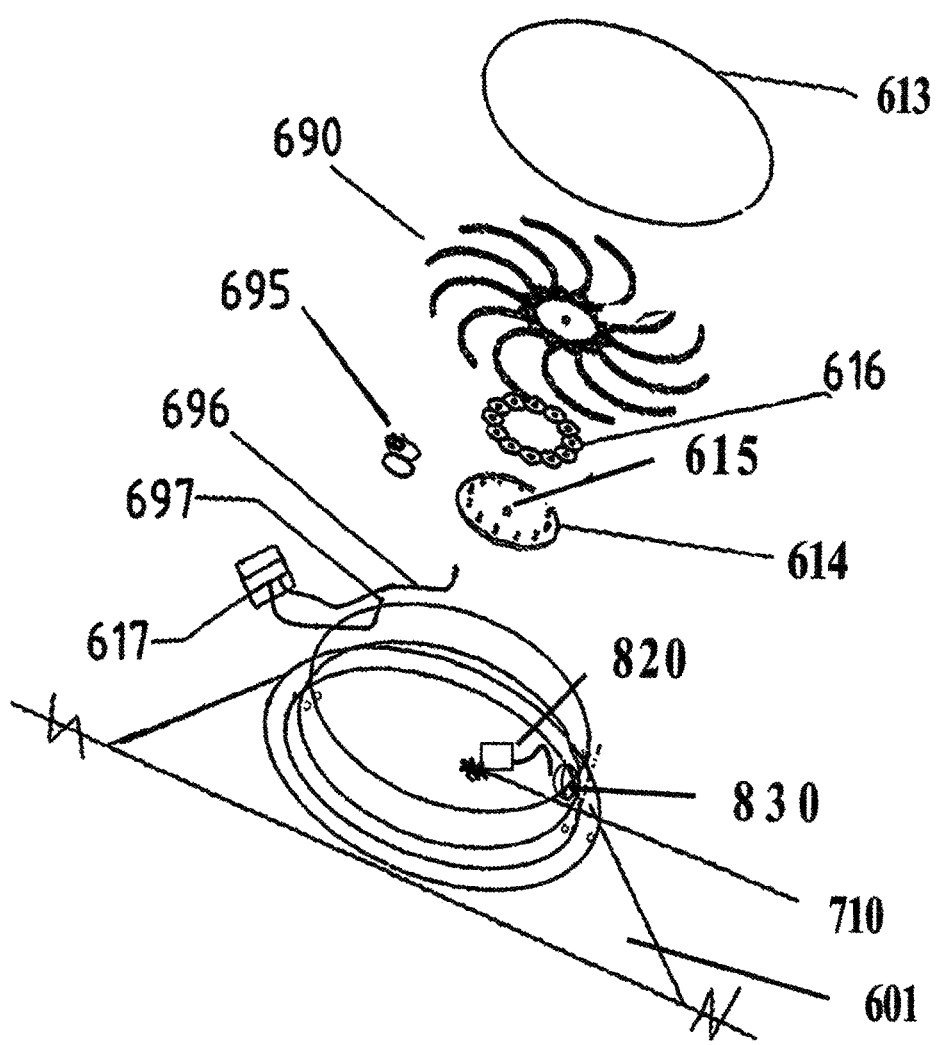
FIG. 5 is a more detailed view of "iris" type moveable baffle approach for supply pressure control and energy scavenging components in the air diffuser housing assembly.

E. Now referring to FIG. 5 which further discloses an explode view of the components on the supply side of the controlling unit. The housing 601 is shown below the internal supply pressure baffle assembly 690. Above is also shown a small turbine blade assemble referenced by numeral 710 used to generate energy to operate the controls and supply storage energy for future use. The power to drive the turbine is extracted from the energy in the air flow supplied by the system blower upstream.

Also shown are components for energy harvesting related to piezoelectric vibration as referenced by numeral 820 and thermoelectric power generation referenced by numeral 830. and Also shown are internal supply air temperature sensor referenced by numeral 696, and internal pressure sensor referenced by numeral 697.

Figure 3:
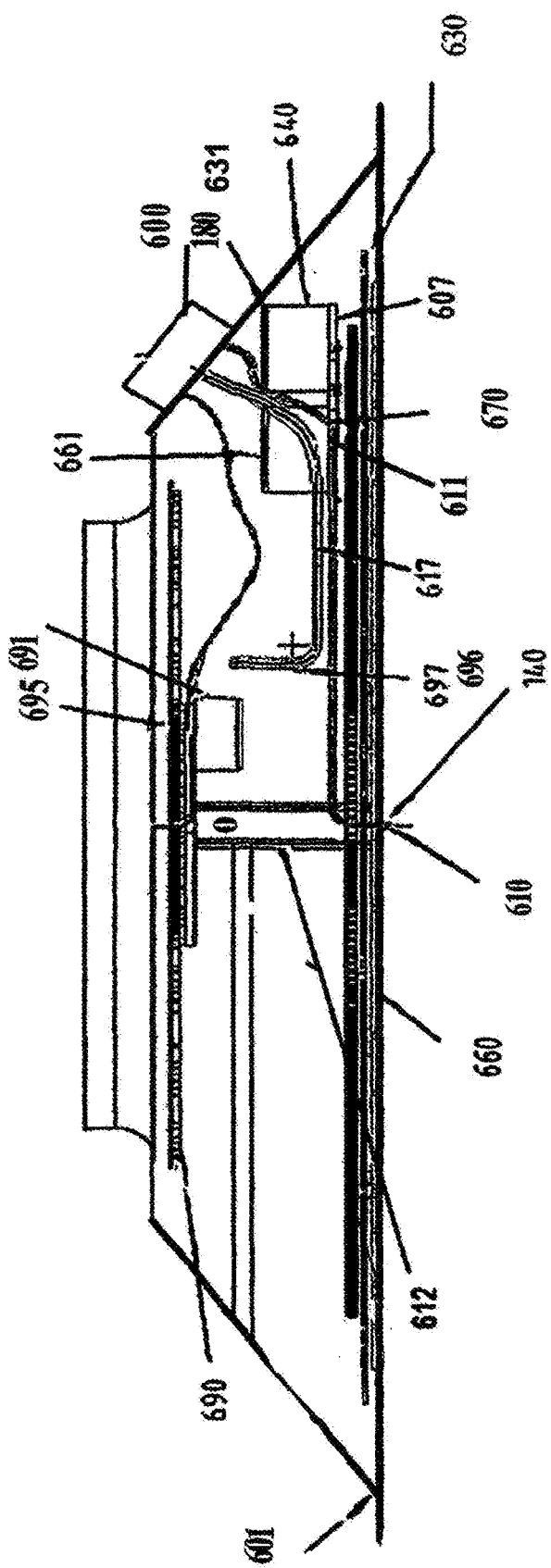
FIG. 3 is a perspective view of the best implementation of the air diffuser housing assembly
Figure 4:
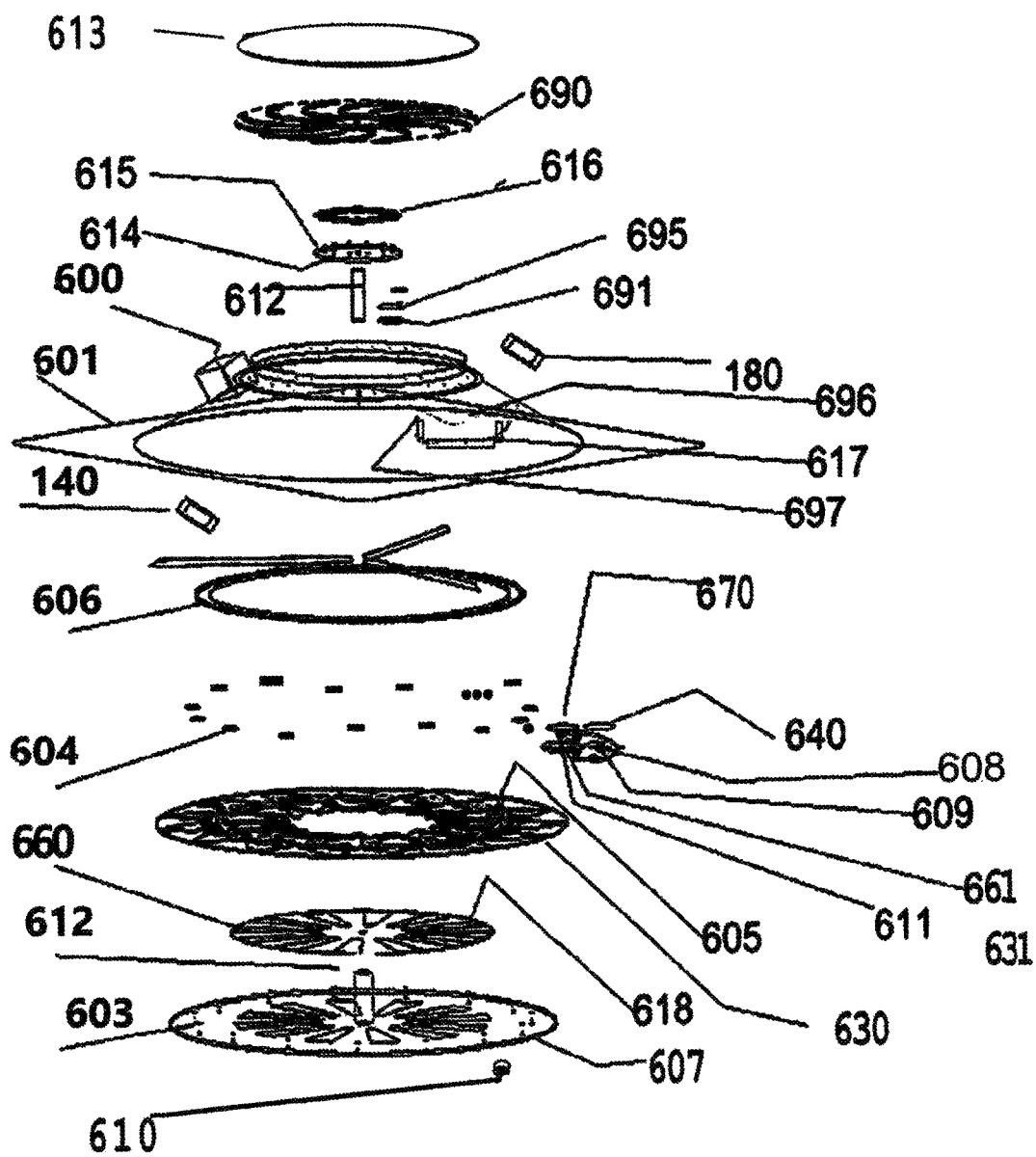
FIG. 4 is an exploded perspective view of the best implementation of the "iris" air diffuser housing assembly.
Figure 6:
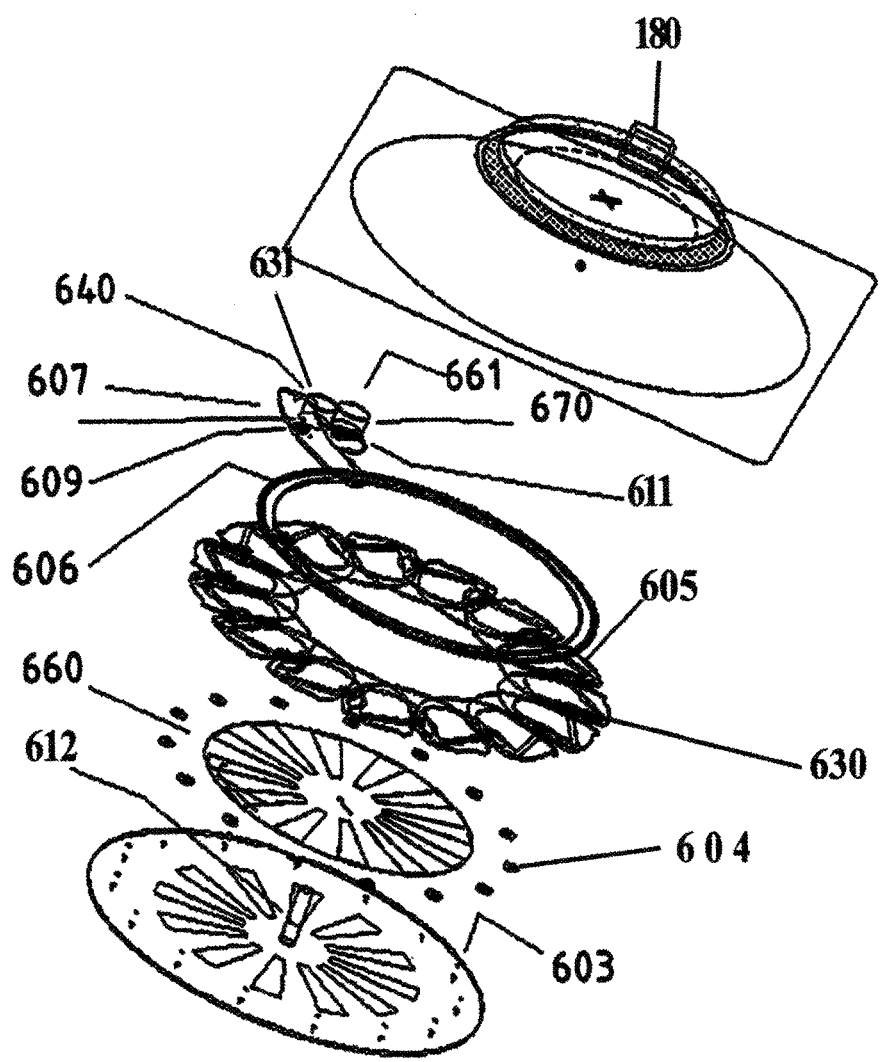
FIG. 6 is a more detailed view of "iris" type moveable baffle approach for room thermal control operation

F, Now referring to FIG. 6 which discloses an further exploded view of the room temperature control assembly depicted in FIG. 3 and FIG. 4. Components are referenced by numerals 180, 603, 604, 605, 606, 607, 609, 611, 612, 630, 631, 660, 661, 670

Figure 7:
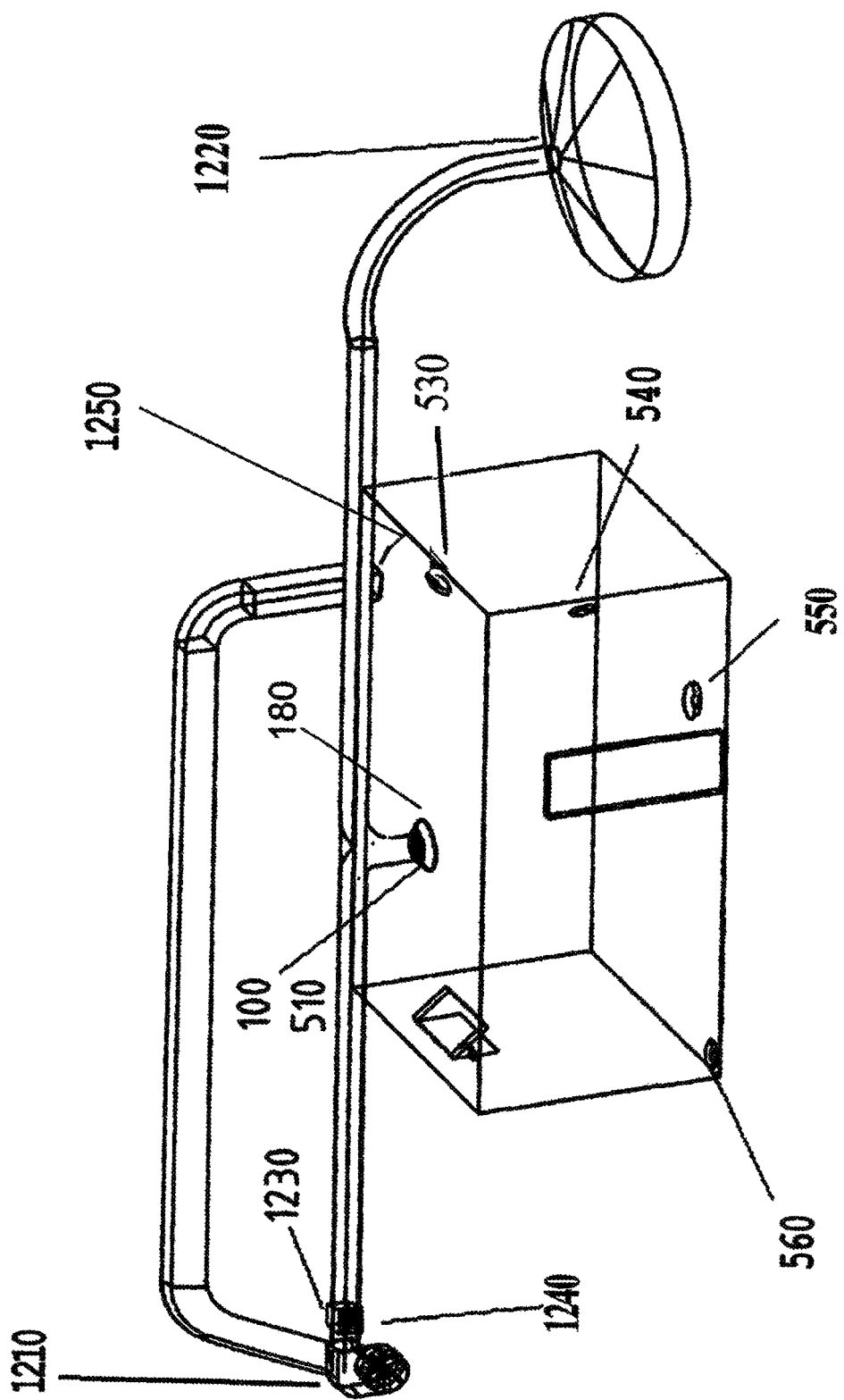
FIG. 7 is a perspective view of a complete HVAC System.

G. Now referring to FIG. 7, which discloses the components of the system providing the conditioned air to thermally control the occupied space. Two possible sources of conditioned air, whether working in parallel or independently, are an electrically powered blower as referenced by numeral 1210 and a solar collector structure producing solar heated air moved mechanical with a blower or hydronic water flow system and by natural buoyancy forces as referenced by numeral 1220. The blower referenced by numeral 1210 when feeding through a heating/cooling chamber referenced by numeral 1230 can produce the temperature and pressure of condition for the proposed air diffuser housing assembly referenced by numeral 100. Wireless or wired communication between the air diffuser housing assembly referenced by numeral 100 and electronic modules on the blower and heating/cooling unit as referenced by numerals 180 allow the energy conservation algorithm in the air diffuser housing assembly referenced by numeral 100 to optimized performance. The operation of the solar collector referenced by numeral 1220 for heating'/ventilation/ventilation cooling with ductwork and dampers controlled by the energy conservation algorithm in the controlling unit 100 is covered in detail in patent application Ser. No. 13/230,835. Alternate locations for the controlling unit are referenced by numerals 510, 560, 530, 540, 550. The return air diffuser allowing air passage back to the system blower referenced by numeral 1210 is referenced by numeral 1250.

Figure 8B:
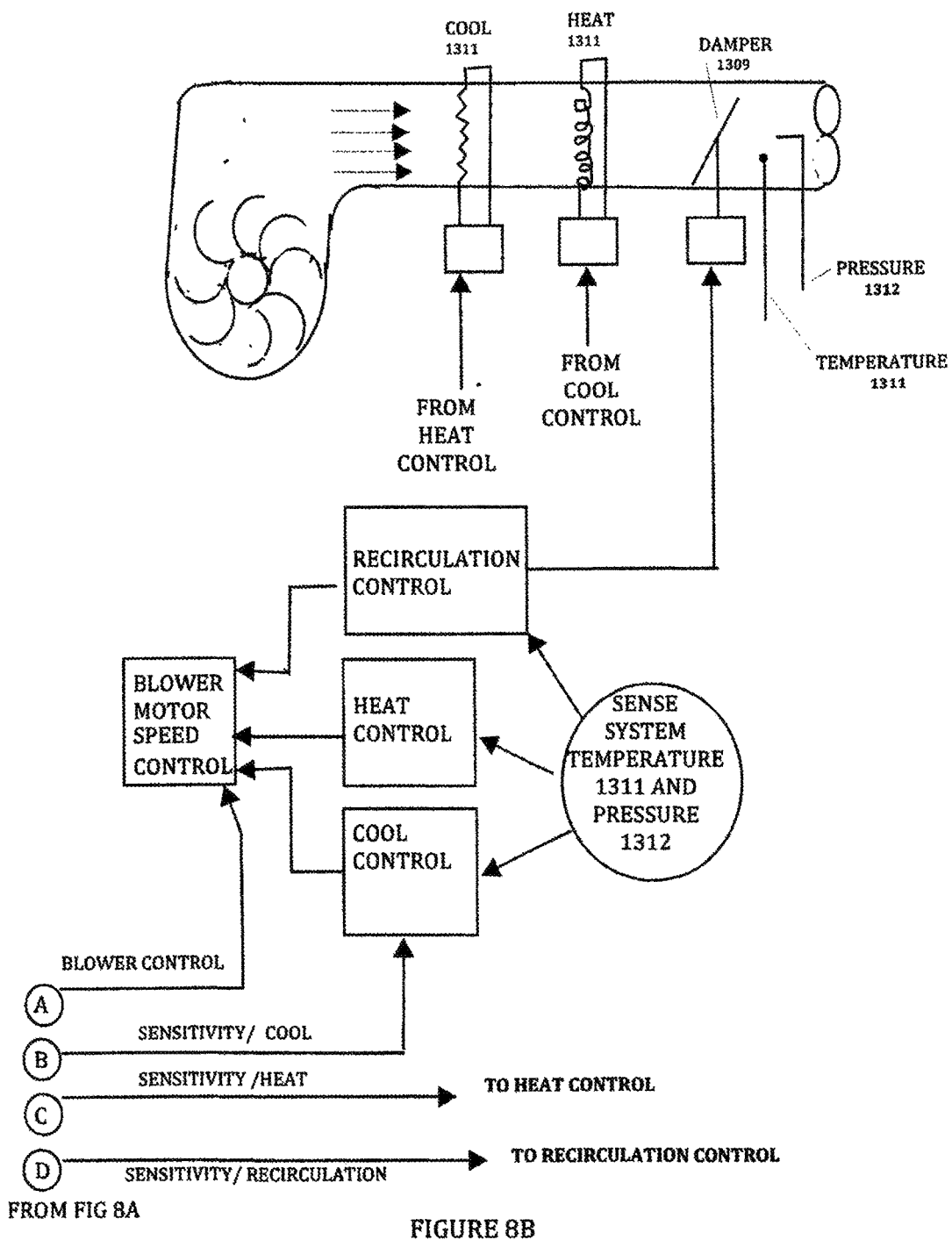
FIG. 8 is a schematic of the control functions for a complete HVAC System.

H, Now referring to FIG. 8 which discloses a schematic for the completed system outlining the logic applied to the individual components for optimum energy efficiency control. Signals are received from a multitude of air diffuser housing assemblies described in FIGS. 1-7 as referenced by process numeral 1301. User input information is received to "weight" the value of each air diffuser housing assembly referenced by numeral 1301 as to its effect on the operation of the system cooling unit, the system heating unit, the system refrigeration unit referenced by numeral 1305, the blower motor control referenced by numeral 1310, and the damper control referenced by numeral 1309. The system control algorithm applies the weight factors from the user input referenced by process step numeral 1302 and air diffuser housing assemblies numeral 1301 as referenced by process step numeral 1303 and determines if the system should be in heating, cooling, or recirculation referenced by numeral 1305 and the speed of the blower motor referenced by 1310, and the position of the system flow control damper referenced by 1309 as referenced by process control step numeral 1304. As a function of the user input referenced by numeral 1302 the system can be utilized to maximize comfort while minimizing energy usage. This "just enough on time' concept is enabled as a result of detailed feedback from each air diffuser housing assembly detailed in FIGS. 1-7.

Figure 9A:
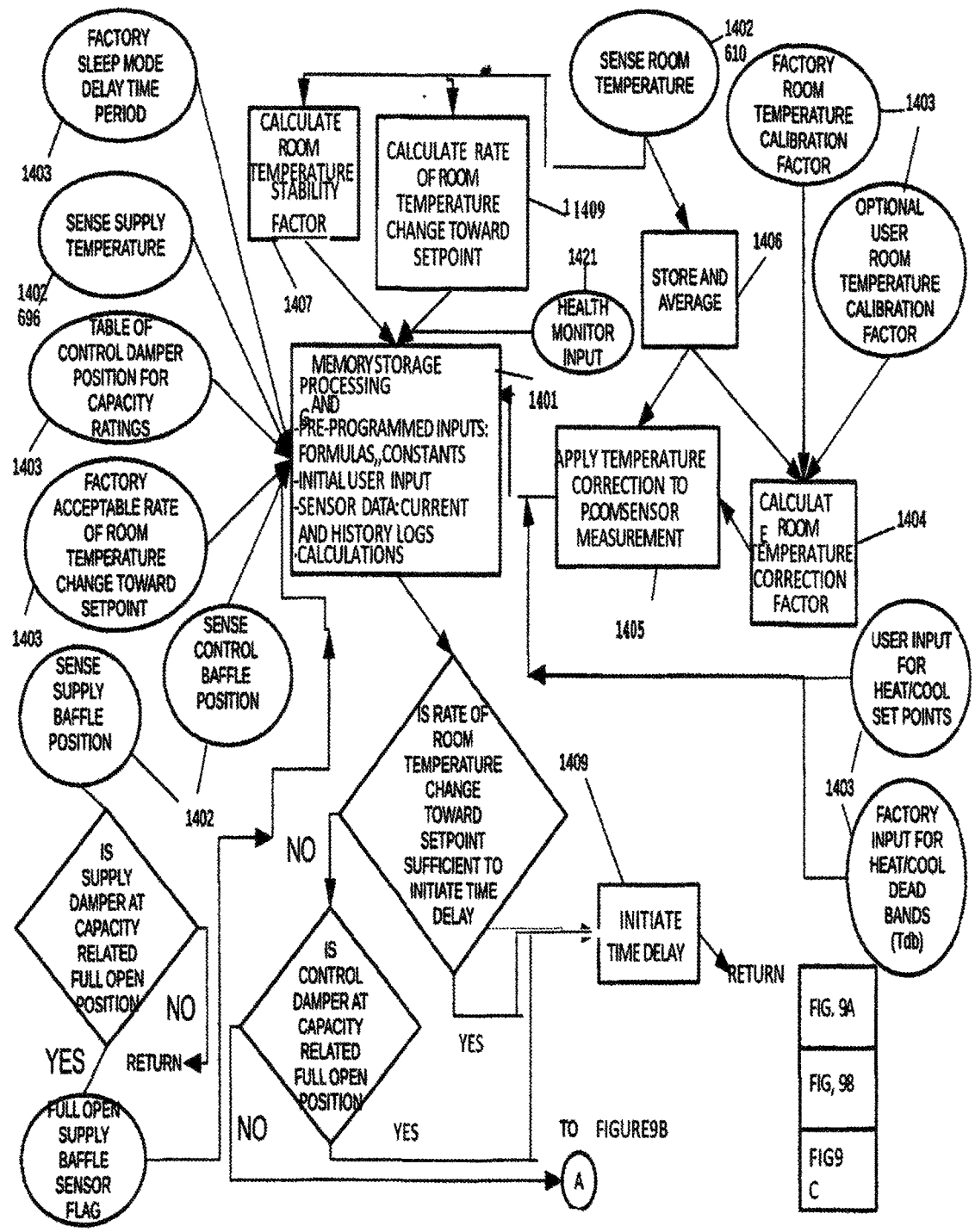
FIG. 9 is a schematic of the control algorithm for the thermal environment control.
Figure 9B:
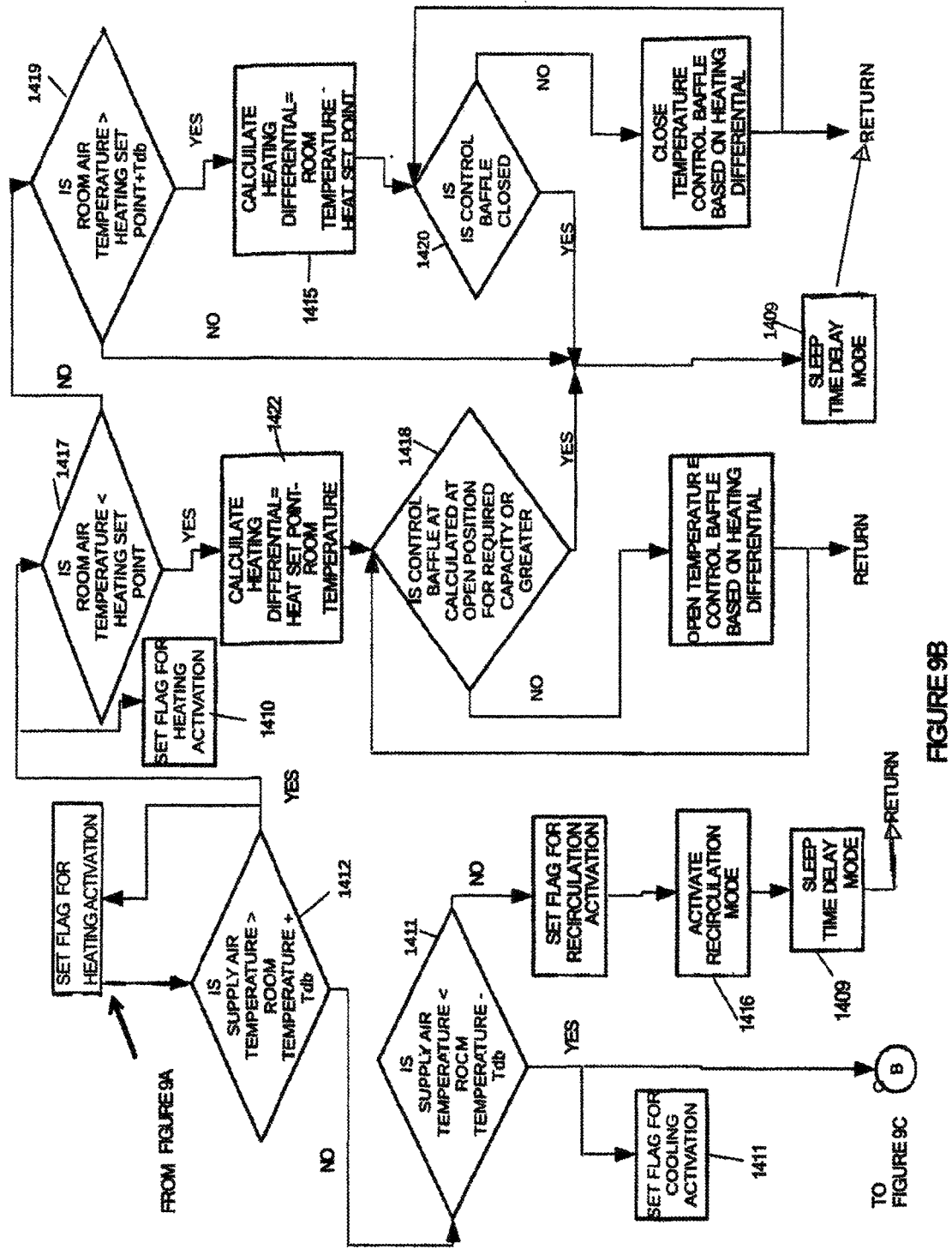
Figure 9C:
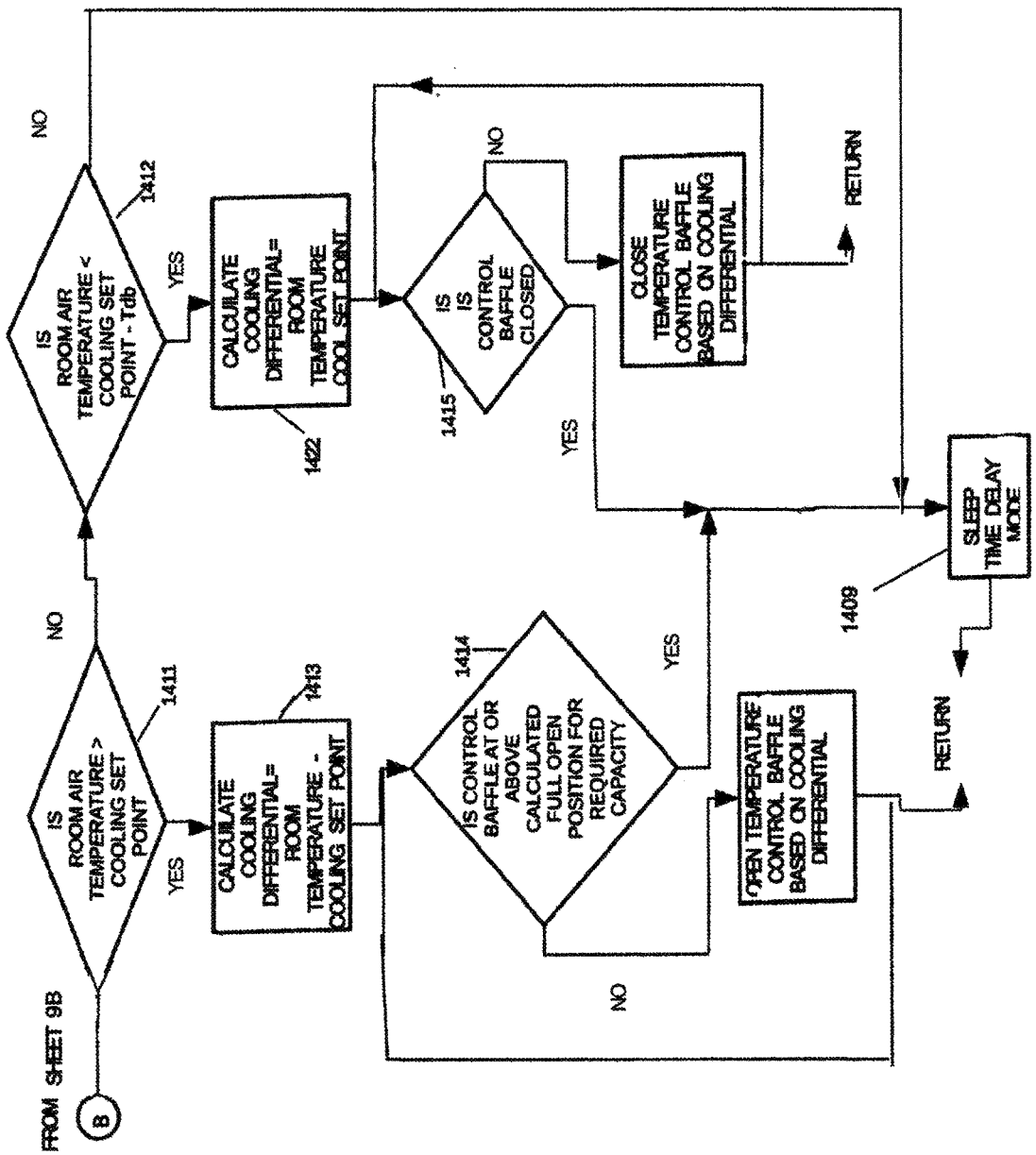

I.—Now referring to FIG. 9 which discloses the logic for the temperature control of the occupied space environmental control system. The algorithm is stored in an integrated circuit referenced by numeral 1401 that receives the dynamic sensor inputs during the control operation referenced by numeral 1402 and receives the fixed calibration inputs, whether factory default or e user determined, referenced by numeral 1403. The algorithm applies the correction factors to the current measurement from infrared sensor referenced by numeral 610 in FIG. 3 in process steps referenced by numerals 1404, 1405 and 1406. The algorithm stores each consecutive temperature sensor reading from the room temperature infrared sensor referenced by numeral 610 in FIG. 3 and supply air temperature sensor referenced by numeral 696 in FIG. 3. The logical steps based on the algorithm follows the process steps referenced by numerals 1409-1422. The next step, after storing the factory and user input, is to determine a time delay period during which the electronics within the enclosure referenced by numeral 600 powers down to minimum and no signal is sent to actuators referenced by process numerals 1414, 1415, 1418 and 1420 when actuator can no longer change position of control baffle in the desired direction if the baffle is fully open or fully closed. Each process cycle indexes a counter in the registry for number of cycles in the cooling mode as determined by process numeral 1411 or the heating mode determined by process numeral 1412 or the recirculation mode referenced by process numeral 1416. The duration of consecutive cycles in each mode dictates the time delay initiated in process numeral a. An exception to the complete electronics power down during the time delay is initiated in medical applications. A health monitor sensor would send a wireless signal to the wireless receiving unit numeral 140 more frequently for critical life monitoring referenced by process numeral 1421. After the time delay has expired, the algorithm determines if the system temperature is above the room temperature by a specified amount initiating the heating mode referenced by process numeral 1410, if the supply temperature is below room temperature by a specified amount initiating the cooling mode referenced by process numeral 1411, or if the supply temperature if within the plus and minus dead band (Tdb) around the room temperature initiating the recirculation mode referenced by process numeral 1416. Typically, but not exclusively, in the heating mode numeral 1410, a signal is sent to actuator numeral 640 to close the moveable horizontal air flow baffle referenced by numeral 630. Similarly, in the cooling mode numeral 1411, a signal is sent to actuator numeral 670 to close the moveable vertical air flow baffle assembly referenced by numeral 660. In the cooling mode operation, if the room temperature is greater the cooling set point and the temperature control baffle is in an intermediate position between full open and full closed, an opening signal is sent to the actuator numeral 640 in accordance with process numerals 1413 and 1414. In the heating mode operation, if the room temperature is less the heating set point and the temperature control baffle is in an intermediate position between full open and full closed, an opening signal is sent to the actuator numeral 670 in accordance with process numerals 1422 and 1415. In either the heating mode numeral 1410 or cooling mode numeral 1411, no signal is sent to actuators referenced by numeral 640 and referenced by numeral 670, thereby maintaining current open position.

Figure 10A:
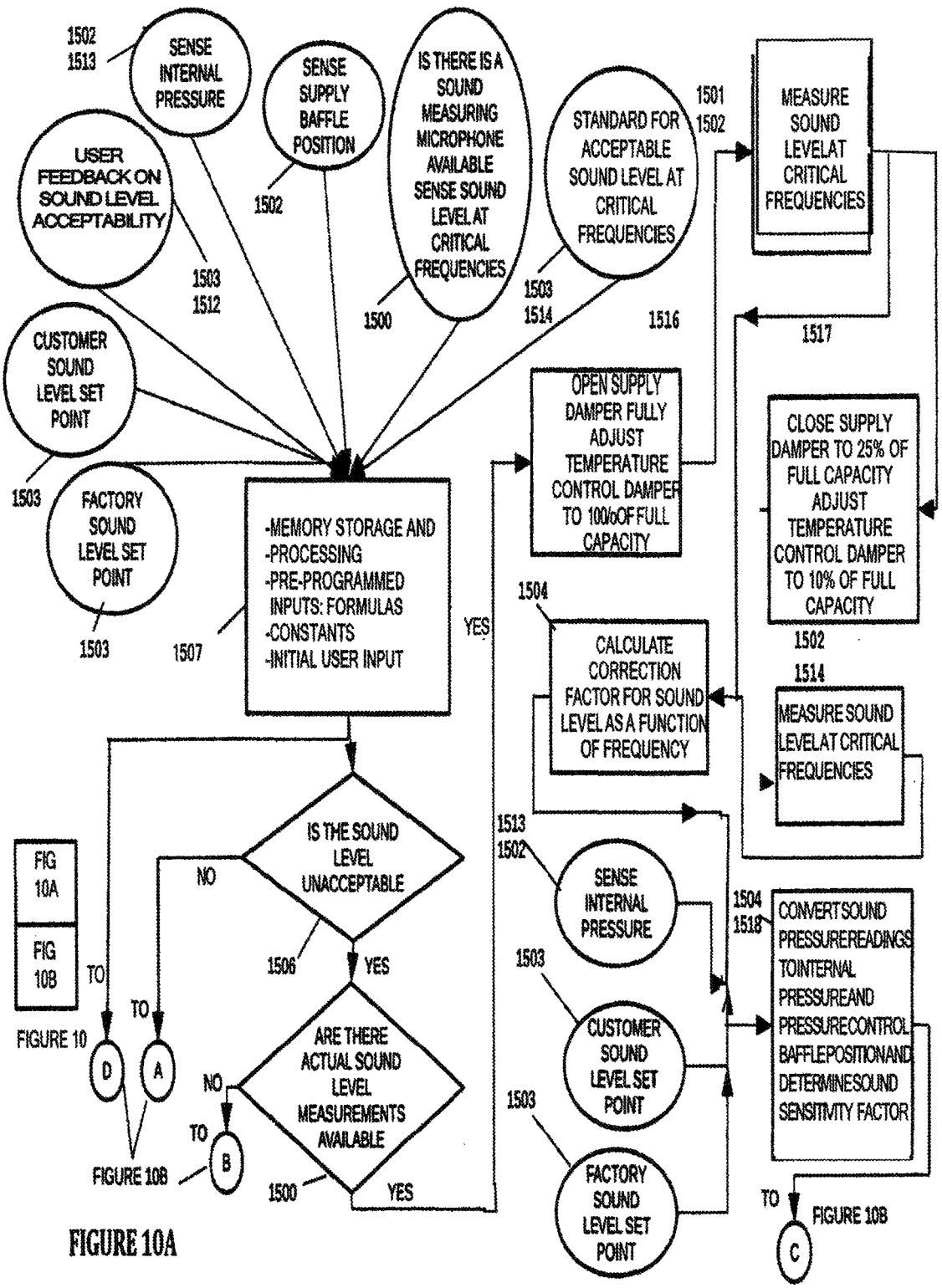
FIG. 10 is a schematic of the control algorithm for the sensitivity of the air diffuser housing assembly air diffuser housing assembly referenced by numeral.

J.—Now referring to FIG. 10 which discloses the control operation of the static pressure supply baffle. The first step is to store in memory reference by process numeral 1507 all factory default inputs and user defined inputs referenced by process numeral 1503. All related sensor inputs for pressure referenced by process numeral 1502 are recorded in memory. Determine if there is a microphone input for sound measurements as reference by process numeral 1500. If the sound level is unacceptable as referenced by process numeral 1506, then the customer user set point input referenced by process numeral 1512 initiates recalibration as referenced by process steps 1504, 1513, 1514, 1516, and 1517. Recalibration of the relationship between the pressure sensor reading as referenced by process numeral 1513 and microphone sensor referenced by process numeral 1514 is performed as referenced by process numeral 1504. During the recalibration process the static pressure control baffle is repositioned according to process numerals 1516 and numeral 1517. A new relationship between microphone readings and sound rating are calculated and stored as referenced by process numeral 1507. With all the operational inputs stored, the first step in the control operation is to determine if the temperature control baffle actuator position sensors referenced by numerals 630 and 661 are in the fully closed position. If they are then the pressure control baffle actuator position sensor referenced by numeral 691 is driven to its fully closed position and the program starts over at the next iteration. If the temperature control baffle actuator position sensors are not, then the program continues with process steps referenced by numerals 1501, 1509, 1510, and 1511 to control internal pressure sensor input from internal pressure sensor referenced by numeral 697. If the pressure is above set point the internal supply pressure actuator referenced by numeral 695 is actuated to close the baffle to a position dictated by the control algorithm and measured by pressure actuator position sensor numeral 691 as referenced by process step 1509. If the pressure is below set point the internal supply pressure actuator referenced by numeral 695 is actuated to open the baffle to a position dictated by the control algorithm and measured by pressure actuator position sensor numeral 691 as referenced by process step 1511.

Figure 11:
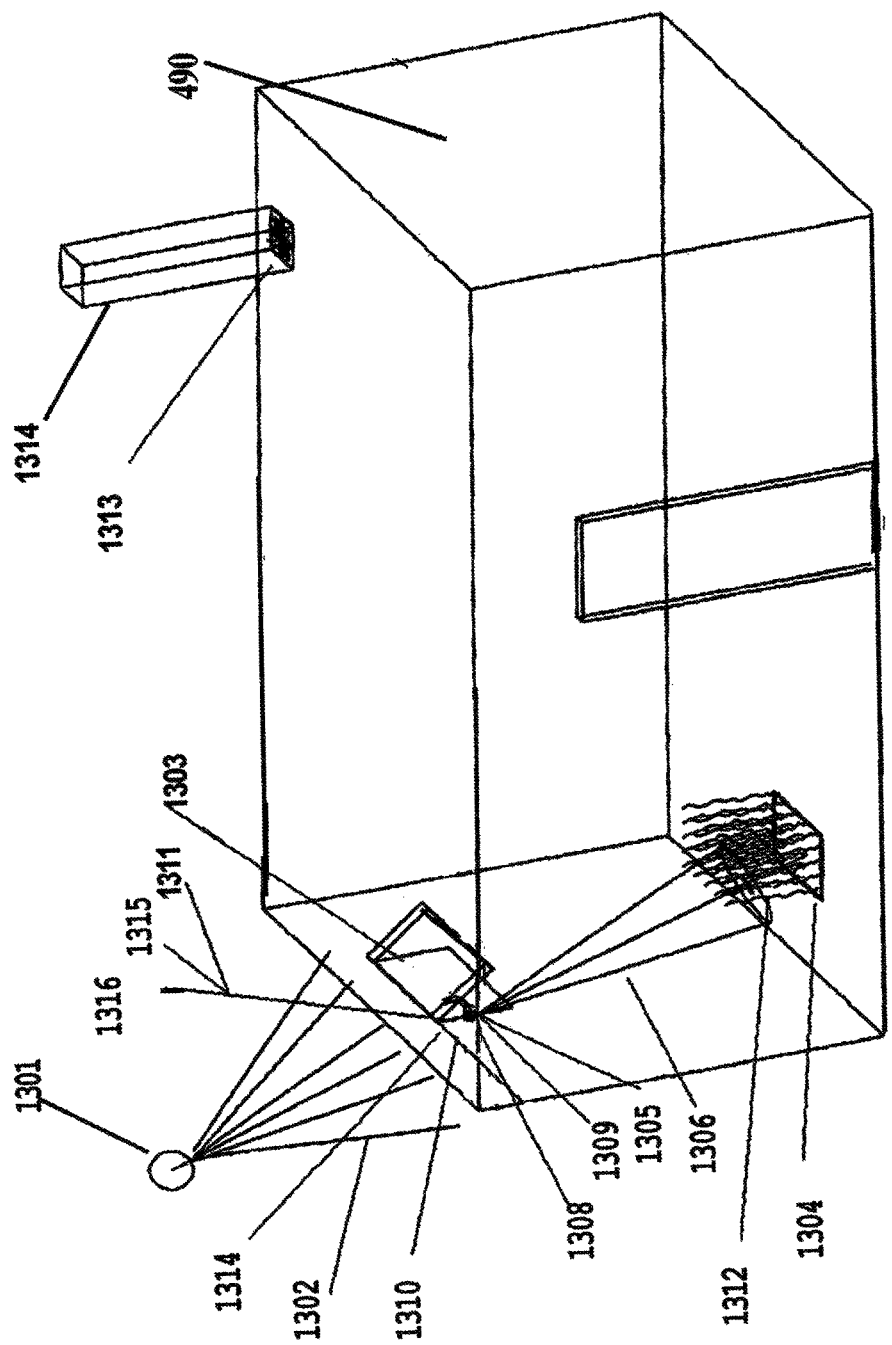
FIG. 11 is a perspective view of an intelligent moveable window/shutter/damper assembly

K. Now referring to FIG. 11 which discloses the operation of a smart window. When thermal radiation referenced by numeral 1302 from the sun referenced by numeral 1301 passes through a window referenced by numeral 1303 and heats the floor area within a room referenced by 490 referenced by numeral 1304. The heated air rises as referenced by numeral 1312 rises and raises the temperature within the enclosed space referenced by numeral. A infrared sensor referenced by numeral 1305 with its area of surface temperature measurement referenced by numeral 1306 measures the temperature of the floor area 1304 near the window 1303. If the surface temperature measurement exceeds a preset set point and the outside ambient temperature referenced by numeral 1314 as measured by the ambient air temperature sensor referenced by numeral 1310 is below the set point, the control algorithm within the control module referenced by numeral 1308 sends a signal to the actuator referenced by numeral 1309 to open the window. Cooler air flows into room driven by ambient outside wind or negative pressure within the space. This negative pressure is created by mechanical fans referenced by numeral 1313 or the buoyancy effect of the heated area within the room rises upward through a vertical tower referenced by numeral 1314 to ambient conditions. No power is required for this system as a result of energy harvesting from a thermoelectric module referenced by numeral 1311. The system would include a battery referenced by 1315 or super capacitor referenced by 1316 for energy storage.

What is claimed is:

1. An electrically powered actuator assembly comprising: a housing, an actuator mounting plate connecting to said housing, an actuator mounted to said actuator mounting plate, an electronic control unit connected to said housing, a moveable air flow baffle assembly comprising at least one baffle plate, at least one bearing; whereby said housing, said actuator mounting plate, said moveable air flow baffle assembly, and said bearing form said electrically powered actuator assembly; said actuator being attached to said moveable air flow baffle assembly and configured to control said moveable air flow baffle assembly, whereby said actuator engages in said at least one baffle plate to rotate said at least one baffle plate creating a flow gap; and, an infrared sensor in communication with said electrically powered actuator assembly, whereby said infrared sensor measures a temperature and opens or closes said baffle plate based on a comparison of said temperature to a threshold temperature.

2. The electrically powered actuator assembly of claim 1, wherein said housing assembly is mounted within a room in at least one of the following: a) a ceiling; b) a wall; and c) a floor.

3. The electrically powered actuator assembly of claim 2, wherein said housing assembly is powered by an energy supply comprising: an energy harvesting assembly, a battery or a super capacitor.

4. The electrically powered actuator assembly of claim 2, wherein said housing is window frame, said moveable air flow baffle is a moveable window assembly, said actuator being attached to said moveable window assembly for the control of the said moveable window assembly in response to signals from said infrared sensor;

whereby said actuator engages said moveable window assembly to move said moveable window assembly creating said flow gap; said infrared sensor being configured measure temperature proximate said moveable window assembly.

5. The electrically powered actuator assembly of claim 4, wherein said window assembly is powered by an energy supply comprising: an energy harvesting assembly, a battery or a super capacitor.

* * * * *